(12) United States Patent
Jacobsohn et al.

(10) Patent No.: US 8,682,381 B2
(45) Date of Patent: Mar. 25, 2014

(54) METHOD OF ACCESSING CLOSED GROUPS IN RADIO ACCESS NETWORK

(75) Inventors: Dieter Jacobsohn, Bonn (DE); Maik Kirsch, Sankt Augustin (DE); Sebastian Speicher, Bonn (DE)

(73) Assignee: Deutsche Telecom AG, Bonn (DE)

( * ) Notice: Subject to any disclaimer, the term of this patent is extended or adjusted under 35 U.S.C. 154(b) by 669 days.

(21) Appl. No.: 12/741,414

(22) PCT Filed: Sep. 25, 2008

(86) PCT No.: PCT/EP2008/008174
§ 371 (c)(1),
(2), (4) Date: Jul. 19, 2010

(87) PCT Pub. No.: WO2009/065460
PCT Pub. Date: May 28, 2009

(65) Prior Publication Data
US 2010/0298023 A1    Nov. 25, 2010

(30) Foreign Application Priority Data
Nov. 23, 2007  (DE) .......................... 10 2007 056 788

(51) Int. Cl.
*H04W 48/00*    (2009.01)
(52) U.S. Cl.
USPC ....................................................... 455/525

(58) Field of Classification Search
USPC ......................................................... 455/525
See application file for complete search history.

(56) References Cited

U.S. PATENT DOCUMENTS

| 5,917,816 | A | * | 6/1999 | Jacobsohn | .................... 370/352 |
| 6,807,417 | B2 | | 10/2004 | Sallinen | |
| 8,583,080 | B2 | * | 11/2013 | Mori | .............................. 455/411 |
| 2007/0054668 | A1 | * | 3/2007 | Scheinert et al. | ........... 455/435.1 |
| 2008/0095374 | A1 | * | 4/2008 | Schreyer | ....................... 380/282 |
| 2008/0244698 | A1 | * | 10/2008 | Takatsuji et al. | .................... 726/2 |
| 2009/0036126 | A1 | * | 2/2009 | Morikuni et al. | ........... 455/435.2 |
| 2011/0107436 | A1 | * | 5/2011 | Cholas et al. | .................... 726/29 |

FOREIGN PATENT DOCUMENTS

JP         2007306312 A    11/2007

\* cited by examiner

*Primary Examiner* — Bobbak Safaipour
(74) *Attorney, Agent, or Firm* — Andrew Wilford

(57) ABSTRACT

The invention relates to a method for establishing a radio link between a non-authorized mobile radio terminal (B) and a base station (C) of a mobile radio network (D). According to the invention, an authorization is given to the mobile radio terminal (B) in order to use the base station (C) as access to the mobile radio network (D), said mobile radio terminal (B) can be authorized at least temporarily, in particular manually, and the base station (C) transmits a corresponding release notice to the mobile radio terminal (B), and a radio link between the mobile radio terminal (B) and the base station (C) of the mobile radio network (D) is established.

3 Claims, 2 Drawing Sheets

A = mobile radio terminal of the owner or main user of the acess point
B = mobile radio terminal of the visitor
C = acess point of the closed user group
D = mobile radio network A = mobile radio terminal of the owner or main user of the acess point
B = mobile radio terminal of the visitor
C = acess point of the closed user group
D = mobile radio network

METHOD OF ACCESSING CLOSED GROUPS IN RADIO ACCESS NETWORK

CROSS REFERENCE TO RELATED APPLICATIONS

This application is the US-national stage of PCT application PCT/EP2008/008174, filed 25 Sep. 2008, published 28 May 2009 as WO2009/065460, and claiming the priority of German patent application 102007056788.1 itself filed 23 Nov. 2007.

FIELD OF THE INVENTION

The invention relates to a method of establishing a radio link between an unauthorized mobile radio terminal and a base station of a mobile radio network, utilization of the base station as access point to the mobile radio network requiring an authorization of the mobile radio terminal.

BACKGROUND OF THE INVENTION

Standardized mechanisms for assigning a radio link is prevent an uncontrolled access to radio network access points which are only released for closed groups. It is the state of the prior art that the mobile radio terminal is informed of the permitted access points via the existing macrocell network, i.e., e.g. via adjacent radio network access points not closed for a mobile radio terminal and having possibly a greater range, and that these permitted access points are stored in the mobile radio terminal (or in the subscriber identity module (SIM) possibly contained therein).

In the case where there is no existing macrocell coverage, there is no link between the mobile radio terminal and the mobile radio network so that there cannot be any corresponding allocation, i.e. provision of information of the permitted access points, either.

OBJECT OF THE INVENTION

It is the object of the invention to provide a method by means of which it is made possible to register a mobile radio terminal in radio network access points, i.e. especially base stations of a mobile radio network in order to provide for access to the mobile radio network even if there is currently no link between the mobile radio terminal and the mobile radio network.

SUMMARY OF THE INVENTION

It is particularly advantageous in this context that in the method of establishing a radio link between an unauthorized mobile radio terminal and a base station of a mobile radio network, utilization of the base station as access point to the mobile radio network requiring an authorization of the mobile radio terminal, that the mobile radio terminal can be authorized at least temporarily, especially can be authorized manually, and the base station transmits a corresponding approval message to the mobile radio terminal and a radio link is set up between the mobile radio terminal and the base station of the mobile radio network.

As a result, it is possible to use an existing base station with restricted access as access to a mobile radio network also with a mobile radio terminal which is unauthorized per se. This requires a corresponding temporary and/or manual authorization, for example of a visitor by the owner or main user or administrator of the base station.

The release is required since the mobile radio terminal, which is actually not authorized, e.g. of a visitor in the area would not be selected as dial-in point by the mobile radio terminal due to the fact that the base station existing in the area is not stored in the mobile radio terminal as permissible access point to the mobile radio, network i.e. the mobile radio terminal would not attempt to register in the existing base station as access point to the mobile radio network to which there is currently no radio link. After a temporary and/or manual release, i.e. authorization of a further mobile radio terminal, however, it is possible to register this further mobile radio terminal in the base station and to use the base station as access point to a mobile radio network.

A temporary or general access authorization is preferably stored within an authorized mobile radio terminal, in particular, the identifier of the base station can be stored within the authorized mobile radio terminal which makes it possible that the authorized mobile radio terminal starts a registration attempt as soon as it is within range of the base station.

It is possible that the temporary and/or manual authorization of a second mobile radio terminal is provided by the transmission of an authorization message from an authorized mobile radio terminal to the mobile radio network.

As a result, it is possible that, for example, a temporary and/or manual release for a further mobile radio terminal, not authorized per se, can be provided, for example by the owner or main user or an administrator of a base station by confirmation to an authorized mobile radio terminal and transmission of such a confirmation message to the mobile radio network.

An attempt at registration and/or attempt at setting up a connection by an unauthorized mobile radio terminal preferably triggers at the base station the request of an authorization message and/or a manual authorization in that a corresponding message is generated by the base station. This makes it possible to request the release at the base station from an unauthorized mobile radio terminal.

An identification of mobile radio terminals authorized generally or temporarily can be provided, e.g. by means of the MSISDN. It is possible that identifications of mobile radio terminals authorized generally or temporarily are stored in the base station and/or in the mobile radio network.

BRIEF DESCRIPTION OF THE DRAWING

Two embodiments of the method according to the invention are shown in the figures and explained in the text which follows. In the figures

DETAILED DESCRIPTION OF THE INVENTION

The figures show two variants of registering a mobile radio terminal in a base station with restricted access for setting up a connection to a mobile radio network in an area without a network coverage which is adequate, i.e. goes beyond the base station with restricted access.

Figure 1:
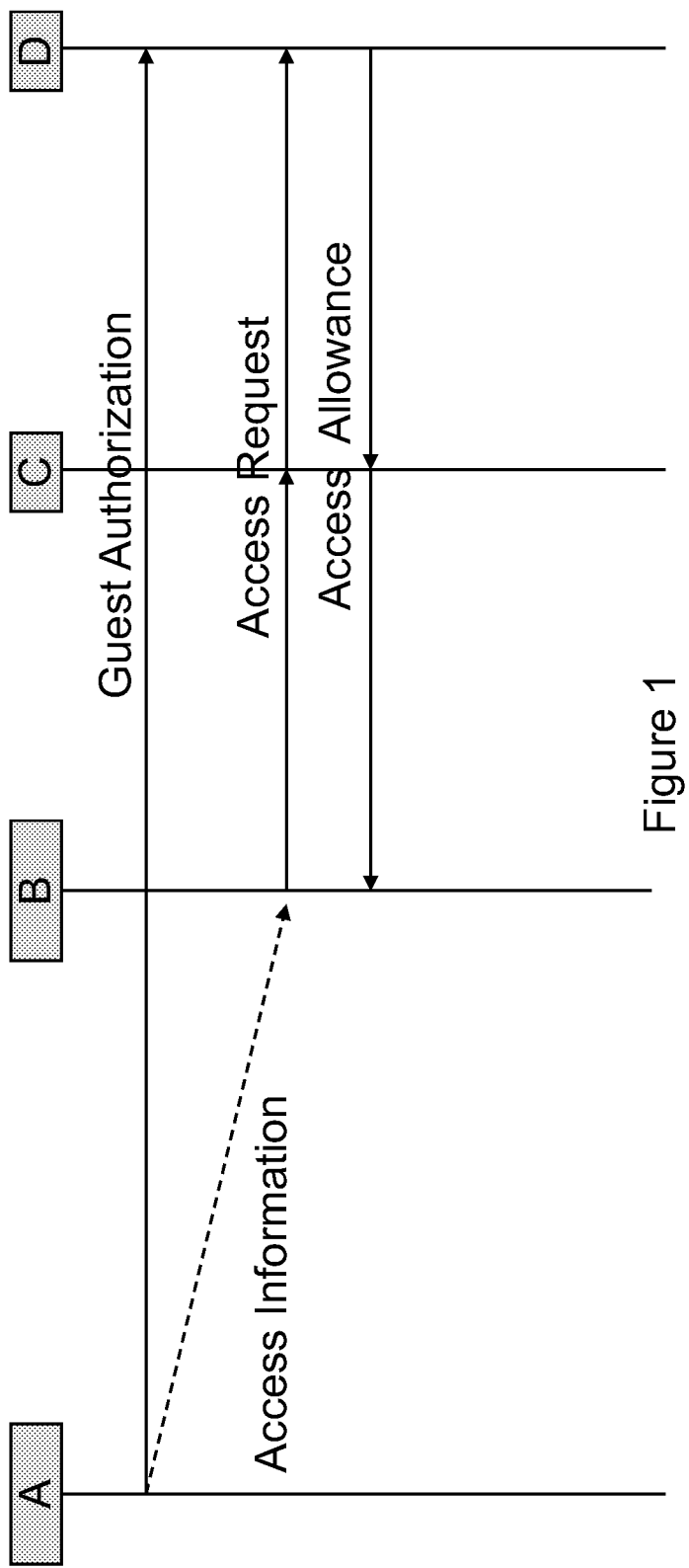
FIG. 1 shows a diagrammatic representation of the registration of a mobile radio terminal in a base station with restricted access in accordance with a first embodiment.

In a first embodiment of the method the assigning of the permitted access points is carried out in a two-part process according to FIG. 1.

1. Authorization of the visiting mobile radio unit B by the owner or main user or an administrator of the access point by means of the mobile radio terminal A of the owner or main user or administrator.

2. Registration of the visiting mobile radio unit B in the mobile radio network D via the visited access node C.

Figure 2:
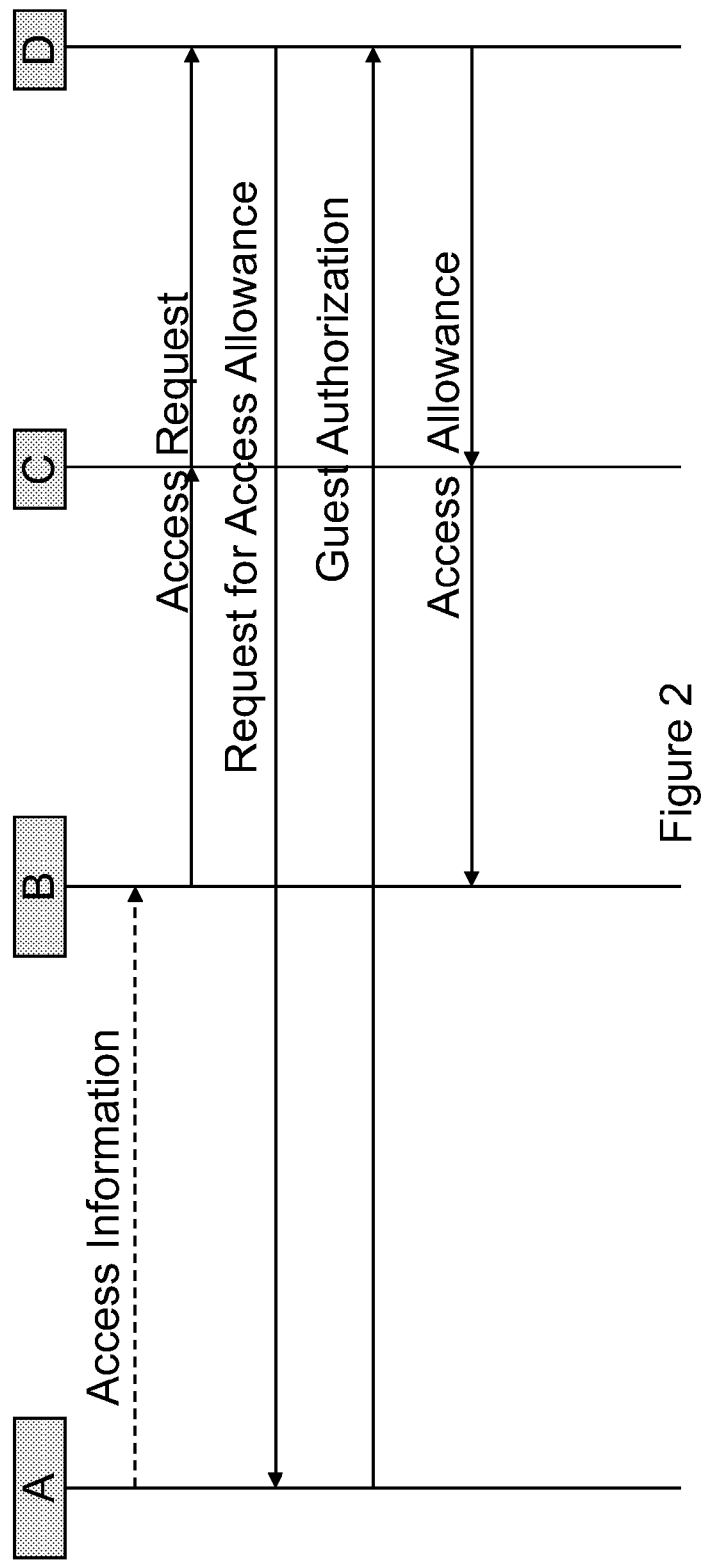
FIG. 2 shows a diagrammatic representation of the registration of a mobile radio terminal in a base station with restricted access in accordance with a second embodiment.

An alternative solution consists of a four-stage process according to a second embodiment of the method according to the invention according to FIG. 2:

1. Attempt at registration of the visiting mobile radio unit B in the mobile radio network D via the visited access node C.
2. Authorization request for the visiting mobile radio subscriber B at the owner or main user or administrator A of the access point C.
3. Authorization of the visiting mobile radio unit B by the owner or main user or administrator A of the access point C.
4. Registration of the visiting mobile radio unit B in the mobile radio network D via the visited access node C.

The registration or attempt at registration, respectively, are carried out on the basis of the access point identification to be handed over by the owner or main user or administrator or an administration unit A of the access point C.

As an alternative, this access point identification can be selected from a list, shown in the visiting mobile radio unit B, of the currently available access points C.

The invention claimed is:

1. A method of establishing a radio link between an unauthorized mobile radio terminal and a base station of a mobile radio network, utilization of the base station as access point to the mobile radio network requiring an authorization of the unauthorized mobile radio terminal, the method comprising the steps of sequentially:

when the unauthorized mobile radio terminal makes a registration attempt or a connection-setup attempt to the base station or the mobile radio network, generating and transmitting from the base station or the mobile radio network to an authorized mobile radio terminal a request for an authorization message;

the authorized mobile radio terminal, in response to the request, transmitting to the mobile radio network an authorization message that authorizes the unauthorized mobile radio terminal at least temporarily;

transmitting from the base station to the unauthorized mobile radio terminal an approval message; and setting up an at least temporary radio link between the unauthorized mobile radio terminal and the base station of the mobile radio network.

2. The method as claimed in claim 1, wherein an identification of mobile radio terminals authorized generally or temporarily is provided by a MSISDN (Mobile Subscriber Integrated Services Digital Network Number).

3. The method as claimed in claim 1, wherein identifications of mobile radio terminals authorized generally or temporarily are stored in the base station or in the mobile radio network or in both the base station and the mobile radio network.

* * * * *